United States Patent [19]

Rossi et al.

[11] Patent Number: 4,821,626

[45] Date of Patent: Apr. 18, 1989

[54] PRESSOSTAT FOR PRESSURE SENSITIVE ACTIVATION

[75] Inventors: Guglielmo Rossi; Mario Gemma, both of Linkenheim; Hans Bösing, Oftersheim, all of Fed. Rep. of Germany

[73] Assignee: Ranco Incorporated of Delaware, Dublin, Ohio

[21] Appl. No.: 543,925

[22] Filed: Oct. 20, 1983

[30] Foreign Application Priority Data

Oct. 29, 1982 [DE] Fed. Rep. of Germany ....... 3240231

[51] Int. Cl.⁴ ........................... F01B 19/00; F16J 3/00

[52] U.S. Cl. ........................................ 92/48; 92/64; 92/97

[58] Field of Search .................... 92/5, 37, 48, 64, 97, 92/132

[56] References Cited

U.S. PATENT DOCUMENTS

| | | | |
|---|---|---|---|
| 729,926 | 6/1903 | Fulton | 92/132 |
| 2,659,310 | 11/1953 | Ryba | 92/132 |
| 2,983,257 | 5/1961 | Euga | 92/48 |
| 3,442,180 | 5/1969 | Babic | 92/97 |
| 3,766,834 | 10/1973 | Kraemer | 92/37 |
| 4,083,290 | 4/1978 | Andres | 92/132 |

FOREIGN PATENT DOCUMENTS

| | | | |
|---|---|---|---|
| 0037282 | 6/1978 | Japan | 92/97 |

*Primary Examiner*—Robert E. Garrett
*Assistant Examiner*—Mark A. Williamson
*Attorney, Agent, or Firm*—Watts, Hoffmann, Fisher & Heinke

[57] ABSTRACT

A pressostat comprises an operating pressure chamber (4) which is limited by its housing (1) and by an operating membrane (5) or the like including a pressure surface for an output adjustment member (3), at least one spring counteracting the pressure (P) in the operating pressure chamber (4), a switch member (2) which responds when a limit pressure value is exceeded in said working pressure chamber (4), and an enclosed protective chamber (6) arranged concentrically to the working pressure chamber (4) limited by the housing (1), the operating membrane (5) and a protective membrane (7) or the like including pressure surface for the output adjustment member (3). In order, if a fracture of the operating membrane takes place, to ensure switch-off at a substantially lower limit pressure value, there is a first spring (10) counteracting the pressure (P) in the operating pressure chamber (4) arranged outside the operating pressure chamber (4) and the protective chamber (6), and a second spring (9) counteracting the pressure (P) in the operating pressure chamber (4) is arranged within the operating pressure chamber (4), and the pressure surfaces of the two membranes (5, 7) are detachably interconnected via an intermediate member (8) which is firmly connected with one of said pressure surfaces.

5 Claims, 1 Drawing Sheet

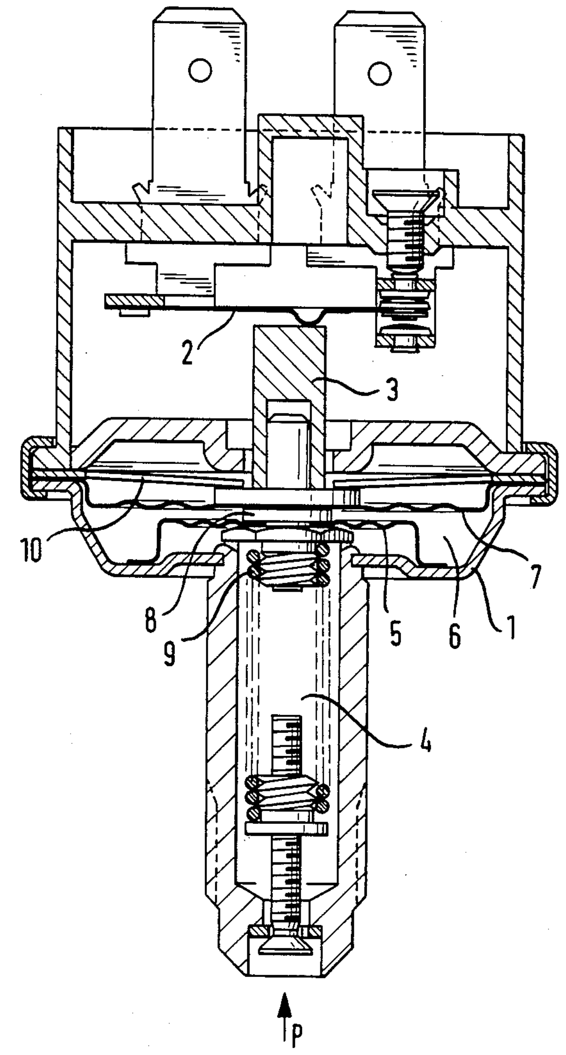
2
3
10
7
8
9
5
6
1
4
p

PRESSOSTAT FOR PRESSURE SENSITIVE ACTIVATION

The present invention relates to pressure sensitive control devices wherein sensed fluid pressure activates the device for operating a switch or the like and more particularly relates to a device of the character referred to wherein the device is provided with constructional features enabling fail-safe operation. Such pressure responsive devices, commonly referred to as pressostats, are generally known in the prior art. An example of such a device, utilizing differential area bellows fixed together by a switch operating rod to provide fail-safe operation, is disclosed by U.S. Pat. No. 3,766,834.

The invention relates to a pressostat comprising an operating pressure chamber which is limited by its housing and by an operating membrane or the like including pressure surface for an output adjustment member, at least one spring counteracting the pressure in said operating pressure chamber, a switch member responding when a limit pressure value is exceeded in said operating pressure chamber, and a closed protective chamber arranged concentrically to said operating pressure chamber limited by said housing, said operating membrane and a protective membrane or the like, and including a pressure surface for said output adjustment member.

The invention is based on the object of providing a pressostat of the type described above, with which while using simple design and safe ways it is ensured that if damage should occur to the operating membrane the switch member responds already to a limit pressure value substantially below the operating pressure limit value.

This object is attained by the invention in that a first spring counteracting the pressure in said operating pressure chamber is arranged outside the operating pressure chamber and the protective chamber and a second spring counteracting the pressure in the operating pressure chamber is arranged within the operating pressure chamber, and that the pressure surfaces of the two membranes are detachably connected with each other via an intermediate member which is firmly connected with one of the pressure surfaces.

If there is a fracture of the operating membrane the effect of the spring within the operating pressure chamber at one ceases, and the limit pressure value for response of the switch member is reduced by a factor which at least corresponds to the ratio of the sum of the spring forces exerted by the two springs to the spring force of the first spring outside the operating pressure chamber and the protective chamber.

It is expedient for the first spring to be a disk spring, while the second spring is a tension spring. An adjustment of the sum of the spring forces and of the ratio of the spring forces to each other can thus be made simply to the first spring on the outside of the operating pressure chamber and of the protective chamber.

Advantageously the spring force of the second spring is larger than that of the first spring. Thus a reduction of the limit pressure value going beyond the factor 2 against the operating pressure limit value is attained when a fracture of the working membrane occurs.

Further the effective pressure surface of the protective membrane can with advantage be larger than that of the operating membrane. Thereby a further increase in the factor by which the limit pressure value is displaced against the operating pressure value on a fracture is achieved proportional to the ratio of the effective pressure surfaces of the protective membrane and the operating membrane.

Finally the protective chamber is expediently filled with a protective gas, e.g. $N_2$, at atmospheric pressure. Due to the protective gas the presence of water vapor in the protective chamber is avoided, which would unfavorably influence the switching precision of said pressostat when the temperatures alter. Further this protective gas makes it possible to carry out a test for leakages without having to destroy the components.

The invention is described below in more detail using an embodiment and the drawing.

FIG. 1 of the drawing shows an embodiment of the pressostat according to the invention in longitudinal section.

The pressostat shown in FIG. 1 has a housing 1 and a switch member 2 arranged in the housing in the form of a snap action switch. The switch member 2 is actuated by an output adjustment member 3. An operating pressure chamber 4 of the pressostat is limited by the housing 1 and by an operating membrane 5 with an effective pressure surface $A_1$. Concentrically with the operating pressure chamber 4 there is an enclosed protective chamber 6, which is limited by the housing 1, the operating membrane 5, and a protective membrane 7 with an effective pressure surface $A_2$. The protective chamber 6 is filled with a protective gas, e.g. $N_2$, at atmospheric pressure.

An intermediate member 8 is firmly connected with the pressure surface of the operating membrane 5 and constitutes detachable connection with the pressure surface of the protective membrane 7. The pressure surfaces operate on the output adjustment member 3 to actuate the switch member 2.

Within the operating pressure chamber 4 there is a spring 9 counteracting the pressure P in the operating pressure chamber 4 in the form of a tension spring, while outside the operating pressure chamber 4 and the protective chamber 6 there is a spring 10 in the form of a disk spring which counteracts the pressure P in the operating pressure chamber 4. Spring 9 has a spring force $F_1$ while spring 10 has a spring force $F_2$.

In normal operation of the pressostat, in the operating pressure chamber 4 the pressure P is supplied by a corresponding installation. As soon as the pressure P multiplied by the effective pressure surface $A_1$ of the operating membrane 5 exceeds the sum of the spring forces $F_1$ and $F_2$ countering the pressure P, the switch member 2 is actuated by means of the intermediate member 8 and the output adjustment member 3. The required limit pressure value is designated by $P_1$.

If a break occurs in the operating membrane 5, the effective pressure surface $A_1$ of the operating membrane 5 as well as the force $F_1$ of spring 9 on the output adjustment member 3 become ineffective and the pressure P now acts on the effective pressure surface $A_2$ of the protective membrane 7 against the force $F_2$ of the spring 10 acting on the membrane 7. The switching of the switch member 2 now takes place at a limit pressure value $P_2$, which results from the force $F_2$ divided by the effective pressure surface $A_2$ of the protective membrane 7. The switch member 2 is thus actuated when the limit pressure value $P_2$ is exceeded. The limit pressure value $P_2$ is found by the following equation:

$$P_2 = P_1 \cdot F_2/(F_1+F_2) \cdot A_1/A_2$$

From this equation it can easily be seen that the pressure $P_2$ granted identical spring forces $F_1$ and $F_2$ as well as identical effective pressure surfaces $A_1$, $A_2$ amounts to 50% of the limit pressure value $P_1$. On an increase in the spring force $F_1$ against the spring force $F_2$ the limit pressure value $P_2$ is further reduced against the limit pressure value $P_1$ and the same applies when the effective pressure surface $A_2$ is enlarged against the effective pressure surface $A_1$.

Due to the provision of the spring 9 in the operating pressure chamber 4 and the provision of the spring 10 acting in the same direction, but outside the operating pressure chamber 4 and outside the protective chamber 6, the result, especially when the spring force $F_1$ the spring 9 is greater than the spring force $F_2$ of the spring 10, is that in a simple and safe way a lower limit pressure value $P_2$ against the limit pressure value $P_1$ in normal operation is established when the operating membrane 5 breaks. By an increase in the ratio between the effective pressure surfaces $A_2$ and $A_1$ of the protective membrane 7 and the operating membrane 5, this effect can also be increased. The design of the spring 10 as a cup spring makes it possible simply to adjust the total spring force.

What is claimed:

1. A pressostat comprising: a housing; an operating membrane connected to said housing to define, with said housing, an operating pressure chamber communicating with a source of operating pressure to be monitored, said operating membrane including a pressure surface acted upon by pressure in said operating chamber; a protective membrane connected to said housing to define, with said housing and said operating membrane, a protective chamber disposed adjacent said operating chamber with said protective membrane defining a second pressure surface acted upon by pressure in said protective chamber, said protective chamber sealed against communication with ambient atmospheric pressure and pressure in said operating chamber; a switch supported in fixed relation to said housing; an output member between said protective membrane and said switch for actuating said switch in response to limit pressure in said operating pressure chamber; an intermediate member between said membranes, said intermediate member fixedly connect ed to one of said pressure surfaces and abutting said other pressure surface for transmitting pressure forces from said operating chamber to said output member via said protective membrane while freely enabling movement of said membranes away from each other; first spring means for resiliently opposing movement of said output member by pressure force applied to either of said membranes; and second spring means for resiliently resisting movement of said operating membrane in response to operating pressure applied thereto in said operating chamber, said second spring means normally effective to resiliently resist operation of said switch by said operating membrane in response to pressure in said operating chamber and rendered ineffective to resiliently resist operation of said switch upon a failure of said pressostat resulting in fluid communication between said operating pressure chamber and said protective chamber so that said switch is actuated by fluid pressure force applied to said protective membrane in said protective chamber by a predetermined fluid pressure substantially less than said limit pressure when such failure occurs.

2. A pressostat according to claim 1, wherein said first spring means is a disk spring and the second spring means is a tension spring.

3. A pressostat according to claim 1, wherein the spring force of the second spring means is larger than that of said first spring means.

4. A pressostat according to claim 1 wherein the effective pressure surface of said protective membrane is larger than that of said operating membrane.

5. A pressostat according to claim 1, characterized in that said protective chamber is filled with a protective gas at atmospheric pressure.

* * * * *